United States Patent
Flaherty

(10) Patent No.: US 8,180,296 B2
(45) Date of Patent: May 15, 2012

(54) PROVIDING HAPTIC EFFECTS TO USERS IN A SHORT RANGE WIRELESS SYSTEM

(75) Inventor: Natasha Margaret Minenko Flaherty, Belmont, CA (US)

(73) Assignee: Immersion Corporation, San Jose, CA (US)

( * ) Notice: Subject to any disclaimer, the term of this patent is extended or adjusted under 35 U.S.C. 154(b) by 501 days.

(21) Appl. No.: 12/111,374

(22) Filed: Apr. 29, 2008

(65) Prior Publication Data

US 2009/0270045 A1    Oct. 29, 2009

(51) Int. Cl.
*H04B 7/00*    (2006.01)
(52) U.S. Cl. .............. 455/41.3; 455/41.2; 455/556.1
(58) Field of Classification Search .......... 455/41.2, 455/41.3, 556.1, 556.2
See application file for complete search history.

(56) References Cited

U.S. PATENT DOCUMENTS

| | | | |
|---|---|---|---|
| 6,587,835 B1 | 7/2003 | Treyz et al. | |
| 7,159,008 B1 | 1/2007 | Wies et al. | |
| 7,334,735 B1 * | 2/2008 | Antebi et al. | 235/492 |
| 2005/0149457 A1 * | 7/2005 | Cihula | 705/65 |
| 2007/0057913 A1 | 3/2007 | Eid et al. | |
| 2007/0194110 A1 | 8/2007 | Esplin et al. | |
| 2008/0287147 A1 * | 11/2008 | Grant et al. | 455/466 |

FOREIGN PATENT DOCUMENTS

| | | |
|---|---|---|
| EP | 0 820 178 A2 | 1/1998 |
| EP | 1 804 210 A1 | 7/2007 |
| GB | 2 384 350 A | 7/2003 |

OTHER PUBLICATIONS

PCT/US2009/037640—International Search Report and Written Opinion.
International Preliminary Report on Patentability as issued for International Application No. PCT/US2009/037640, dated Nov. 11, 2010.

* cited by examiner

*Primary Examiner* — Lewis West
(74) *Attorney, Agent, or Firm* — Pillsbury Winthrop Shaw Pittman LLP

(57) ABSTRACT

Systems, methods, and associated software for imposing a haptic effect upon a user are disclosed herein. A user device, which is operable within a wireless interaction system according to one implementation, includes a transceiver that is configured to communicate wirelessly with a host device. The user device further includes a processor that is configured to determine whether a specific interaction event occurs. The interaction event, for example, is related to an interaction with the host device. The user device also includes a haptic actuator that is configured to impose a haptic effect upon a user when the processor determines that the specific interaction event has occurred.

17 Claims, 2 Drawing Sheets

PROVIDING HAPTIC EFFECTS TO USERS IN A SHORT RANGE WIRELESS SYSTEM

TECHNICAL FIELD

The present disclosure generally relates to short range wireless communication systems and more particularly relates to enhancing user feedback when interaction events occur in such systems.

BACKGROUND

Near field communication (NFC) is a wireless technology allowing two electronic devices in proximity to each other to interact. One example of an NFC system is a payment system allowing a consumer to easily pay for products or services. In operation, the consumer holds an NFC card near a merchant's NFC reader or "taps" the card on the reader. When the card and reader are brought within close proximity to each other—within approximately 10 centimeters—a wireless connection over a 13.56 MHz channel is formed between them and a financial transaction can then take place. In this way, the interaction between consumer and merchant are greatly simplified and can be completed in much less time than conventional systems. Because the transmission distance of NFC devices is very short, the transaction is relatively secure. In addition to payment systems, other examples of NFC implementations may include public transit systems, access control systems, etc.

A personal area network (PAN) is defined as another technology that allows electronic devices in proximity to each other to interact. In comparison with NFC, however, PAN devices can interact within a longer range of up to approximately 10 meters and they communicate at a frequency of 2.4 GHz. Some examples of devices compatible with PAN systems include Bluetooth, Zigbee, infrared data association (IrDA) devices, and ultra wide-band (UWB) devices. PAN devices are normally used for wireless data exchange within a single network for an individual or exclusive group.

Devices that incorporate these and other short range wireless technologies often include mechanisms built into one or both of the two interacting devices for providing a confirmation to the user when a predetermined interaction event has occurred. The interaction events can include the completion of a financial transaction, acknowledgement of an acceptable access control key, acknowledgement of acceptable identification of the user, completion of a service purchase, etc. Other types of indications can be provided to communicate when a device is brought within range of a compatible device, when the device carried out of range of the compatible device, when an error occurs during the interaction, etc.

In one particular example, public transit systems in some cities may allow riders to purchase fare cards that are compatible with card readers located at the various stations within the transit system. When the fare card is brought within range of the card reader, a communication channel is established between the card and reader. Depending on the system's design, the fee for the product or service, i.e., cost of the public transit ride, can be automatically deducted from the value of the fare card. If the card includes sufficient funds, the fee is deducted from the card and the turnstile gate is opened for the rider to enter the train loading area. In addition to the opening of the gate, other indications may be provided to indicate that the transaction has completed successfully. For example, the card reader may provide an auditory cue, such as a beeping noise, a visual cue, such as a green light, and/or a summary of the amount deducted from and the amount remaining on the fare card. If the card does not include sufficient funds, other indications may be provided, such as a different beeping tone, a red light, etc.

In some systems, mobile phones can be used in place of fare cards or purchase cards. Since mobile phones already include auditory output, and often use visual output as well, these output mechanisms of mobile phones can be used to indicate certain events in NFC or PAN systems. In such interactions, purchases can be applied to the user's mobile phone bill.

SUMMARY

The present disclosure describes systems and methods involved in short range wireless communication systems. Particularly, haptic effects are provided to a user when a particular interaction event occurs. In one embodiment among several, a user device that is operable within a wireless interaction system comprises a transceiver, a processor, and a haptic actuator. The transceiver is configured to communicate wirelessly with a host device. The processor is configured to determine whether a specific interaction event occurs, where the interaction event is related to an interaction with the host device. The haptic actuator is configured to impose a haptic effect upon a user when the processor determines that the specific interaction event has occurred.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
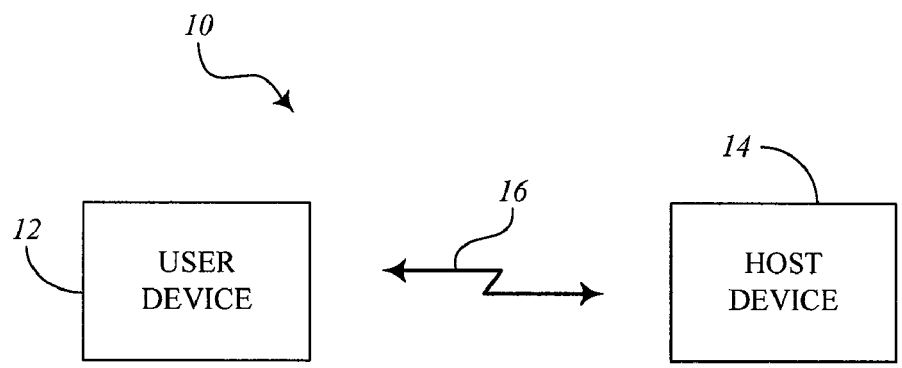
FIG. 1 is a block diagram of a wireless interaction system according to one embodiment.

Contactless integrated circuit devices, such as contactless smart cards, proximity cards, and vicinity cards, are used to allow fast, easy, and secure interactions with a host device. Typically with respect to short range interaction systems, a user device is portable and can be carried easily with the user. To initiate an interaction, the user device is brought in proximity to a host device, which includes compatible wireless communication equipment for interacting with the user device. Once a wireless communication channel is established between the two proximate devices, interaction between can take place. For example, in a purchasing system implementation, information is exchanged to properly associate the purchase with the user of the user device.

In order to confirm that certain events have taken place with respect to the interaction between the user device and host device, designers have typically included mechanisms for providing feedback to the user. In the short range wireless interaction systems, the feedback is typically provided in the form of auditory or visual output. For instance, the host devices typically include output devices for providing auditory and visual cues, which provide confirmation to a user that particular interaction events have occurred. Some non-limiting examples of interaction events include establishment of a wireless coupling between the two devices, disconnection of the wireless coupling, completion of a file transfer, completion of a financial transaction, etc.

User devices such as contactless integrated circuit devices typically do not include auditory or visual output devices. Therefore, confirmation of some interaction event is usually provided by the host device. However, in some short range systems, mobile phones can be used to replace fare cards or purchase cards for interacting with a nearby host device by using NFC technology. Since mobile phones are already equipped with components for providing auditory output, and usually visual output as well, the user can receive confirmation from the user device itself that an interaction event has occurred. In order to further enhance the user interface, other sensory output in addition to auditory and visual output can be provided, as taught herein.

The present disclosure describes systems and methods for providing haptic feedback to a user in a short range wireless communication system. According to the teachings herein, the user devices such as contactless integrated circuit devices, which are carried by the users, can be equipped to provide kinesthetic feedback (such as active and resistive force feedback) and/or tactile feedback (such as vibration, vibrotactile feedback, texture, heat, etc.) to a user. Generally, kinesthetic and tactile feedback is collectively known as "haptic feedback" or "haptic effects". Haptic feedback can provide cues to improve the user interface. Specifically, haptic effects may be useful to confirm to the user that specific interaction events in the short range wireless system have occurred. This haptic feedback can be used to supplement auditory and visual feedback to enhance how information is provided to the user.

The present disclosure describes short range wireless interaction systems in which a user device interacts with a host device when the two devices are in proximity with one another. Short range wireless interaction systems described herein may include near field communication (NFC) technology and personal area network (PAN) technology. However, it should be understood that the teachings of the present disclosure also encompass other short range wireless systems involving wireless communication between two proximate devices. Other implementations and advantages will become apparent to one of ordinary skill in the art from an understanding of the present disclosure.

FIG. 1 is a block diagram illustrating an embodiment of a wireless interaction system 10. In this embodiment, wireless interaction system 10 includes a user device 12 and a host device 14 that communicate with each over a relatively short wireless channel 16. Signals can be wirelessly transmitted from user device 12 to host device 14 and vice versa. In order for user device 12 and host device 14 to interact, the two devices are brought within close proximity to each other. Because of the short range at which user device 12 and host device 14 can communicate, the interaction is designed to occur exclusively between the two devices, which can inherently provide a level of security during the interaction.

Typically, user device 12 is a portable device that can be carried by the user and host device 14 is relatively stationary. In other embodiments, both devices may be portable. Each device includes signal transmission capabilities for communicating with each other in a wireless manner. To establish a wireless connection or coupling between the devices, one or both of the devices periodically transmits a polling signal and waits for a response. The other device may be configured to search for the polling signal, and when the two devices are within range of each other, the device that receives the polling signal may transmit a response signal to acknowledge that the two devices are within range and to establish a communication channel.

When wireless connection is established, the two devices can interact as designed. The interaction between user device 12 and host device 14 may, for example, be a financial transaction. A few non-limiting examples of financial transaction systems include Tap & Go, PayWave, Pay and Go, Touch-n-Go, PayPass, ExpressPay, Blink, etc. Other financial transactions may include the use of prepaid service cards, such as fare cards used in a public transit system. In other embodiments, the interaction between user device 12 and host device 14 may be a transfer or an exchange of data. The interaction may also include an identification check, such as for access control to a restricted area.

User device 12 may be configured according to any number of possible implementations, depending on the particular application. For example, user device 12 may be a contactless integrated circuit card, contactless smart card, smart card, proximity integrated circuit card, proximity card, vicinity card, etc. When embodied as a card, user device 12 may have a credit card form factor for easy portability and storage. User device 12 may also be a mobile phone, cellular phone, personal digital assistant (PDA), digital camera, etc., or any suitable device capable of wirelessly coupling with host device 14 when in proximity with each other.

Host device 14 may be configured as a reader, such as a radio frequency identification (RFID) reader, a retail register, such as a point of service or point of sale (POS) device, or other suitable proximity coupling reader. In some embodiments, host device 14 may include a magnetic loop antenna operating at 13.56 MHz for inductively coupling with a compatible NFC user device 12. When the host device 14 is equipped with a magnetic loop antenna, user device 12 may include an LC circuit, which, in response to the electric field generated by host device 14, can charge up a capacitor to store power for use by the user device 12. In other embodiments, host device 14 may be an information delivery device, such as an information kiosk for providing directions, instructions, advertisements, coupons, or other types of information to a user device in its vicinity. The information delivery device may be associated with an advertising sign or poster or with the location of a merchant.

Wireless interaction system 10 may be used in any number of possible applications. Regarding financial transactions, for example, wireless interaction system 10 may be used by merchants for selling products. Wireless interaction system 10 may be included in a contactless payment system for services, such as public transit, where payment is automatically deducted from the user's card or automatically posted to the user's mobile phone bill. Also, the system may be used for the purchase of fuel, where the user device is a fuel card. Other examples may include use for payment of a public payphones, parking meters, vending machines, etc.

In addition to financial transactions, wireless interaction system 10 may also be used as an identification system, where the user device is an ID card for identifying the user. Similarly, the system may be used as an access control or checkpoint system, where the user device is a keycard or access control card allowing the user to gain access to a specific area, such as an area restricted to certain people. In other embodiments, wireless interaction system 10 may be used as an automated teller machine (ATM) for withdrawing money from a bank. Wireless interaction system 10 may also be used as a way to provide information to a user according to a user's profile or preferences. For example, a retailer or advertiser may provide information regarding sales, coupons, etc. when user device 12 is in proximity to a retail store, advertising sign or poster, etc., having host device 14.

In still other embodiments, wireless interaction system 10 may include a matchmaking system in which user device 12 and host device 14 are peer-to-peer devices, e.g., portable devices such as mobile phones, PDAs, etc. When a person having a matching or compatible personality profile is within range, user device 12 may be configured to alert the user of the other person's presence. In this regard, it may be possible to discreetly inform the user of the potentially compatible person without audible or visual indications that can draw awkward attention to the user.

Wireless interaction system 10 may be configured according to any suitable short range standards. Communication between user device 12 and host device 14 may include any suitable frequency range and may include any suitable transmission strength for coupling the devices up to any suitable distance. In some embodiments, wireless interaction system 10 may be configured according to NFC, PAN, wireless PAN (WPAN), Wi-Fi, or other short range or limited range standards.

Wireless interaction system 10 is configured to provide confirmation to the user when one or more specific events occur related to the interaction between user device 12 and host device 14. User device 12 and/or host device 14 may include output devices to indicate the occurrence of these events. In some embodiments, the output devices may alternatively be incorporated in another device associated with wireless interaction system 10. Wireless interaction system 10 may include auditory and/or visual indications and furthermore includes output mechanisms configured to provide haptic effects to the user.

One or more haptic actuators can be incorporated in user device 12 to apply haptic effects to the user. User device 12 may further include circuitry and/or logic for determining when one or more specific events occur. When it is determined that an event has occurred, user device 12 determines an appropriate haptic effect based on type of event and instructs the haptic actuator to impose the haptic effect upon the user. Haptic feedback can be provided to the user in response to any number of specific events. For example, haptic feedback may be provided when user device 12 and host device 14 are brought within range of each other, thereby indicating that information transfer or exchange between the devices can be made. The event may be the establishment of a wireless connection between the devices or the breaking or loss of the connection. Haptic feedback can also be provided at the start or completion of a financial transaction. In other embodiments, haptic feedback can be provided when a file transfer has completed or when the user is recognized to have authorized access to the secured area.

Figure 2:
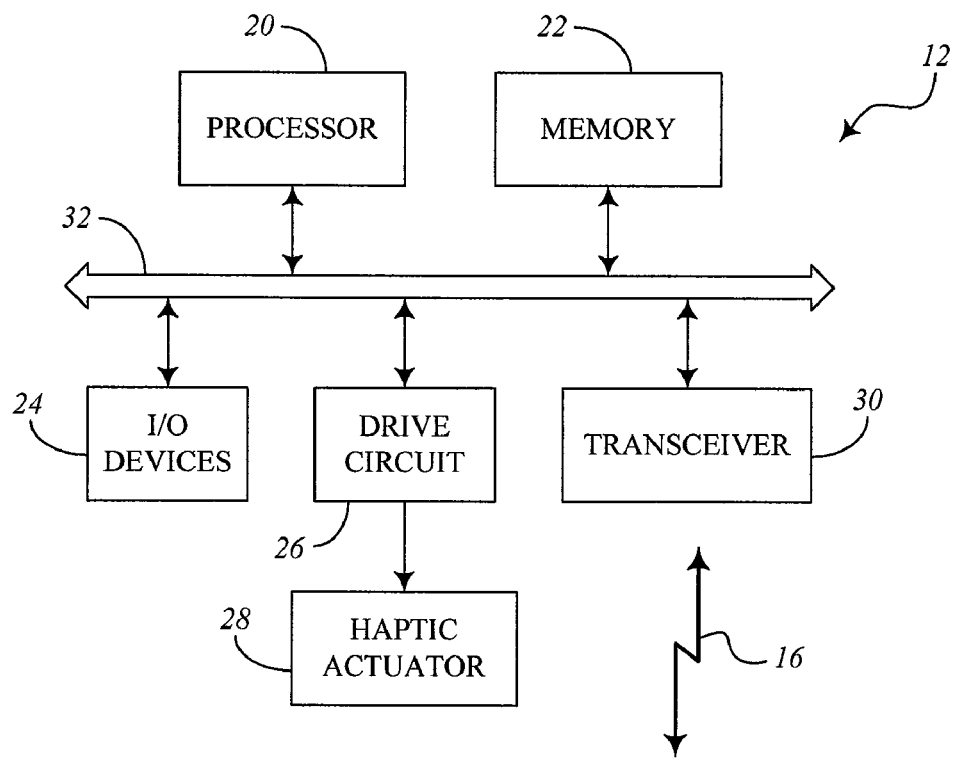
FIG. 2 is a block diagram of the user device shown in FIG. 1 according to one embodiment.

FIG. 2 is a block diagram illustrating an embodiment of user device 12 shown FIG. 1. In this particular embodiment, user device 12 includes a processor 20, memory 22, input/output (I/O) devices 24, drive circuit 26, haptic actuator 28, and transceiver 30. The components of user device 12 are configured to communicate with each other via bus interface 32. I/O devices 24 may include input mechanisms such as keypads, touch screens, buttons, cursor control devices, or other data entry devices. Output devices may include a display screen, audio output device, LEDs, or other visual or auditory output devices. In some embodiments, such as those embodiments involving contactless integrated circuit devices, such as dedicated fare cards, proximity cards, vicinity cards, or other similar card or device, I/O devices 24 are optional and may be omitted, depending on the particular design.

Transceiver 30 may include any suitable short range transmission and reception components for wirelessly communicating with host device 14. Transceiver 30 can be configured according to NFC standards, PAN standards, and/or other similar short range wireless transmission standards. Transceiver 30 may transmit and receive signals at any suitable frequency, including, for example, 2.4 GHz, 13.56 MHz, infrared frequency range, etc. The transmission strength is relatively low to confine signal reception of other device within a short range, such as within about 10 cm, 10 m, etc. Regarding embodiments using RFID or other inductive coupling technology, transceiver 30 may comprise an LC circuit for powering the components of user device 12.

Processor 20 instructs transceiver 30 to transmit or broadcast certain information. Also, information received by transceiver 30 from host device 14 is processed by processor 20. When processor 20 determines that a predetermined event associated with interaction between user device 12 and host device 14 occurs, processor 20 then instructs drive circuit 26 to drive haptic actuator 28 so as to provide a specific haptic effect to the user. In some embodiments, processor 20 can detect a plurality of interaction events and selects a specific haptic effect for each respective event. Haptic actuator 28 can thereby provide different types of haptic effects based on the particular event.

Haptic actuator 28 may include one or more vibration or force applying mechanisms, which are capable of applying vibrotactile or other suitable forces to user device 12. Haptic actuator 28 may comprise an electromagnetic actuator, an eccentric rotating mass (ERM) in which an eccentric mass is moved by a motor, a linear resonant actuator (LRA) in which a mass attached to a spring is driven back and forth, a "smart material" such as piezoelectric material, electro-active polymers, or shape memory alloys.

Processor 20 controls the information being sent to host device 14 and information received from host device 14 and manages the overall operations of user device 12. Memory 22 stores records of account numbers, identification numbers, access codes, remaining balance, or other data or information that may be needed for interaction with host device 14. In addition, memory 22 may store a program, such as a software program, associated with operations for interacting with host device 14. Furthermore, the programs or software stored in memory 22 also include logic for determining when a predetermined interaction event occurs. Based on the event to be determined, additional logic may be used to determine appropriate haptic feedback to be provided to the user.

Processor 20 may be a general-purpose or specific-purpose processor or microcontroller. Memory 22 may include one or more internally fixed storage units or removable storage units. The storage units can be configured to store information, data, instructions, and/or software code. The storage units may include any combination of volatile memory, such as random access memory (RAM), dynamic RAM (DRAM), etc., and/or non-volatile memory, such as read only memory (ROM), electrically erasable programmable ROM (EEPROM), flash memory, etc.

Memory 22 can also store program code that enables processor 20 to execute wireless interaction procedures. Among the wireless interaction procedures, some procedures are executed, according to the teachings herein, to determine when specific interaction events occur. When one such event occurs, logical modules instruct drive circuit 26 to drive haptic actuator 28 for providing proper haptic feedback to the user. Various logical instructions or commands may be included in the program code for enabling interaction with host device 14. The wireless interaction program of the present disclosure can be implemented in hardware, software, firmware, or a combination thereof. When implemented in software or firmware, the wireless interaction program can be stored in memory 22 and executed by processor 20. When implemented in hardware, the wireless interaction program can be implemented in processor 20 using discrete logic circuitry, an application specific integrated circuit (ASIC), a programmable gate array (PGA), a field programmable gate array (FPGA), etc., or any combination thereof.

Wireless interaction software or programs, and related event-responsive haptic feedback procedures can be stored in memory 22. These and other software, programs, or computer code including executable logical instructions as described herein can be embodied in computer-readable media for execution by any suitable processing device. The computer-readable media can included on one or more suitable physical media components that can store the software, programs, or computer code for a measurable length of time.

Figure 3:
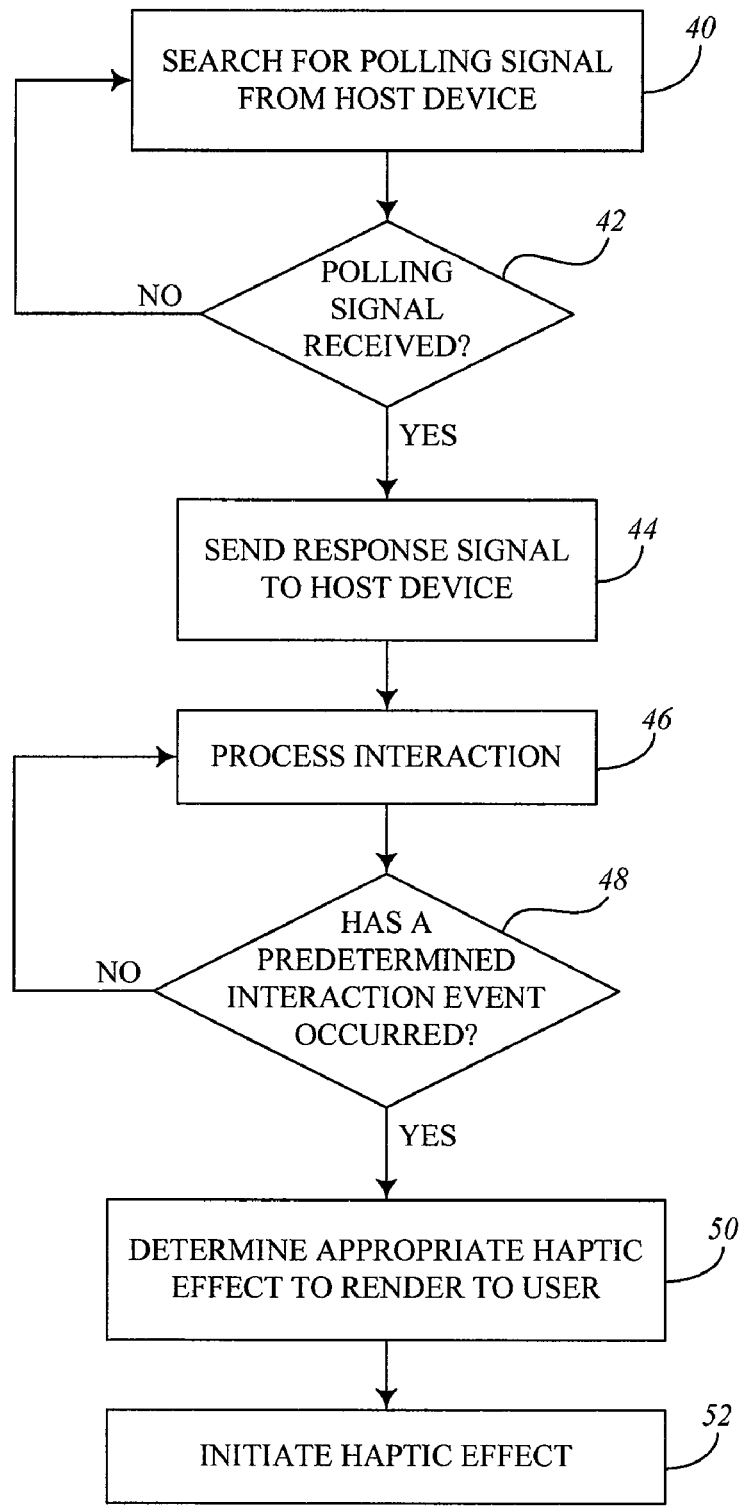
FIG. 3 is a flow chart illustrating a method for providing a haptic effect in a wireless interaction system according to one embodiment.

FIG. 3 is a flow chart illustrating an embodiment of a method for providing haptic effects to a user who is using a device within a short range wireless interaction system. Particularly, the method of FIG. 3 may be associated with the functionality of user device 12 shown in FIGS. 1 and 2. In other embodiments, the method may be associated with the actions of other user devices used in short range wireless interaction systems configured to provide haptic effects. It is noted that a host device, which may be used in cooperation with the user device, may operate according to regular procedures without change. However, in some embodiments, the host device may include additional functionality according to the methods disclosed herein.

As indicated in block 40 of the method, a search for a predefined polling signal from a host device is made. The polling signal may be any suitable signal for initiating a wireless coupling interaction between the host device and a device, e.g., user device, which is configured to communicate with the host device. As indicated in decision block 42, it is determined whether or not a polling signal is received. If not, the method returns to block 40 until a polling signal is eventually received. When it is received, the method proceeds to block 44, which indicates that a response signal is sent to the host device. The response signal may include information that is responsive to the polling signal to indicate that the device is within range of the host device.

The poll/response procedures may be reversed from the manner described with respect to blocks 40, 42, and 44, such that the user device is configured to send polling signals and the host device is configured to respond. Regardless of the manner in which the two devices are linked, a wireless interaction session is established between them. In some embodiments, this interaction occurs between two devices and does not involve other intermediate network devices or channels. However, other embodiments of a wireless interaction system may be implemented for a social networking application, in which more than two devices are linked in a social network. Also, the devices are moved to within close proximity such that only the nearby devices can receive communication signal from each other. The closeness can typically be controlled by a user moving the user device toward the host device or another user device in order to be within range.

Block 46 indicates that an interaction between the device and host device is processed. Depending on the particular application and system, the interaction session may include any number of communications between the two devices to accomplish certain transactions, data transfers, identifications, etc. As indicated in decision block 48, it is determined whether or not a predetermined interaction event occurs. The predetermined interaction event may include any suitable event associated with the interaction session between the two devices. If the predetermined event has not occurred, then the method returns to block 46 and processing of the interaction session continues.

If it is determined that the predetermined event has occurred, then the method proceeds to block 50, which indicates that an appropriate haptic effect to render to the user is determined. The haptic effect may be based on the predetermined event determined with respect to block 48. When the appropriate haptic effect is determined, block 52 indicates that the haptic effect is initiated. The haptic effect or haptic feedback may be imposed upon the user via the user device or may be imposed upon the user using other mechanisms within the wireless interaction system, e.g., a platform on which the user may be standing, etc.

The processing time involved in the interaction between the two devices is relatively short and may be imperceptible to the user. In this regard, the user may simply move the user device toward the host device until the haptic effect is felt. When the user receives the haptic effect as a confirmation of some particular event of the interaction, the user has the added assurance that the interaction event has occurred. However, other types of haptic effects can be applied to the user that may indicate an event or events that may require additional action on the part of the user.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementation examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

I claim:

1. A user device operable within a wireless interaction system, the user device comprising:
   a transceiver configured to communicate wirelessly with a host device, the transceiver configured to communicate with the host device when the transceiver and the host device are located within a short range of each other;
   a processor configured to detect a plurality of specific interaction events between the user device and the host device, and to select a haptic effect from a plurality of haptic effects for each specific interaction event when the specific interaction event occurs; and
   a haptic actuator configured to impose the haptic effect selected by the processor to a user when the processor determines that the specific interaction event has occurred,
   wherein the plurality of specific interaction events includes the user device and the host device being brought within range of each other, an establishment of a wireless connection between the user device and the host device, a loss of the wireless connection between the user device and the host device, and a start or completion of a financial transaction.

2. The user device of claim 1, further comprising memory configured to store information that the transceiver transmits to the host device, the memory further configured to store information that the transceiver receives from the host device.

3. The user device of claim 2, wherein the memory is further configured to store logic executable by the processor for enabling the processor to determine when the specific interaction event occurs.

4. The user device of claim 2, wherein the memory is configured to store information associated with a remaining monetary balance.

5. The user device of claim 2, wherein the memory is configured to store information associated with access control or identification information.

6. The user device of claim 1, further comprising a drive circuit configured to drive the haptic actuator in response to instructions from the processor.

7. The user device of claim 1, further comprising a housing having dimensions approximately equal to the dimensions of a credit card form factor, the housing configured to support the transceiver, processor, and haptic actuator.

8. The user device of claim 1, wherein the transceiver is configured to search for a polling signal within a specific frequency range.

9. The user device of claim 1, wherein the short range is up to approximately 10 centimeters.

10. The user device of claim 1, wherein the user device and the host device are peer-to-peer devices.

11. A method comprising:
    establishing a wireless connection with a host device;
    wirelessly interacting with the host device;
    determining whether a predetermined interaction event selected from a plurality of predetermined interaction events occurs, wherein the interaction events are related to the interaction with the host device, and wherein the predetermined interaction events include entering wireless range of the host device, said establishing the wireless connection with the host device, losing the wireless connection with the host device, and starting or completing a financial transaction via the host device;
    determining an appropriate haptic effect from a plurality of haptic effects to render to the user, wherein the appropriate haptic effect is based on the predetermined interaction event; and
    initiating the appropriate haptic effect upon a user when it is determined that the predetermined interaction event occurs.

12. The method of claim 11, wherein establishing the wireless connection further comprises:
    searching for a polling signal from the host device;
    determining whether the polling signal is received; and
    transmitting a response signal to the host device when the polling signal is received.

13. The method of claim 11, further comprising:
    determining the occurrence of at least two of the plurality of interaction events;
    initiating at least two of the plurality of haptic effects, each particular haptic effect based on the occurrence of the particular interaction event.

14. A computer readable medium comprising an executable haptic effect rendering program configured to be executed by a processor, the haptic effect rendering program comprising:
    logic adapted to determine when a wireless connection is established with a host device;
    logic adapted to process an interaction with the host device;
    logic adapted to analyze the interaction with the host device to determine the occurrence of a predetermined interaction event from a plurality of predetermined interaction events; and
    logic adapted to determine an appropriate haptic effect from a plurality of haptic effects to render to a user via a user device based on the predetermined interaction event, wherein the plurality of predetermined interaction events includes the user device and the host device being brought within range of each other, an establishment of a wireless connection between the user device and the host device, a loss of the wireless connection between the user device and the host device, and a start or completion of a financial transaction.

15. The computer readable medium of claim 14, wherein the logic adapted to determine when the wireless connection is established with the host device is further adapted to determine when the user device is within a short range of the host device.

16. The computer readable medium of claim 15, wherein the short range includes a distance up to approximately 10 centimeters.

17. The computer readable medium of claim 15, wherein the short range includes a distance up to approximately 10 meters.

* * * * *